United States Patent Office 3,664,703
Patented May 23, 1972

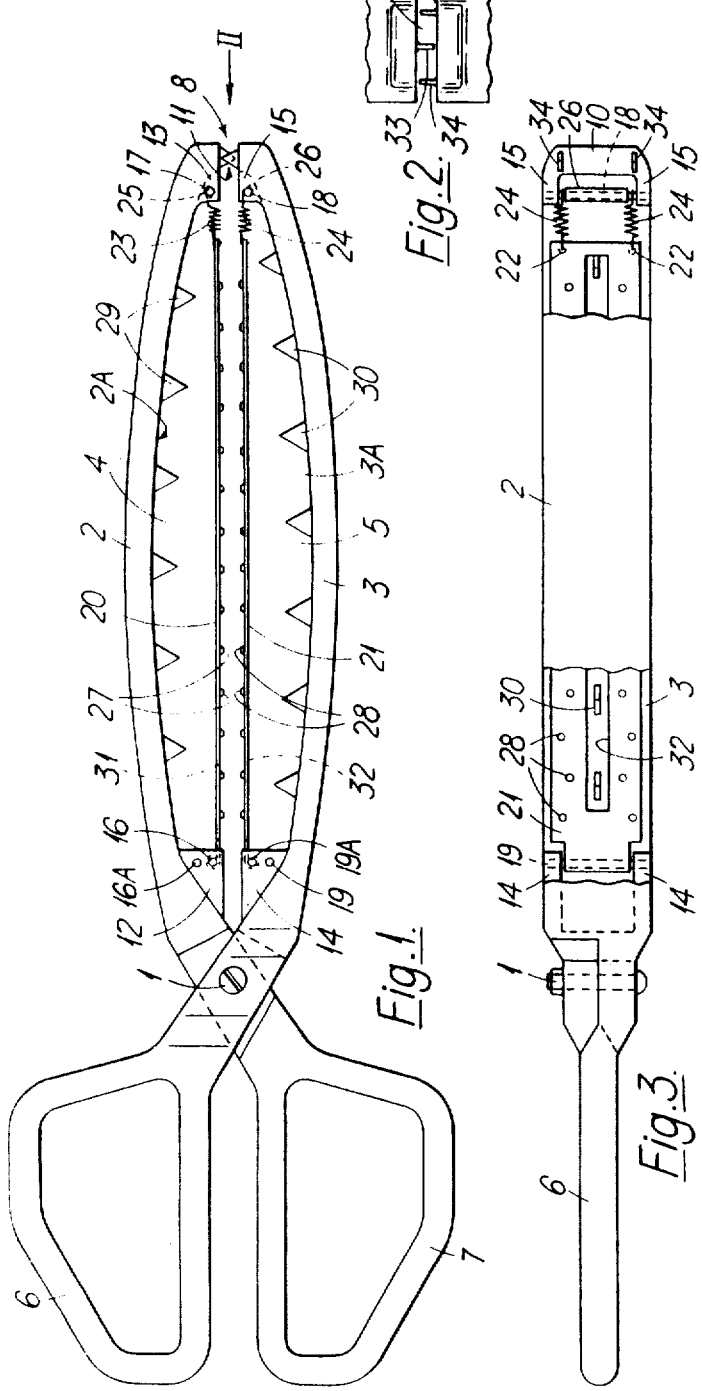
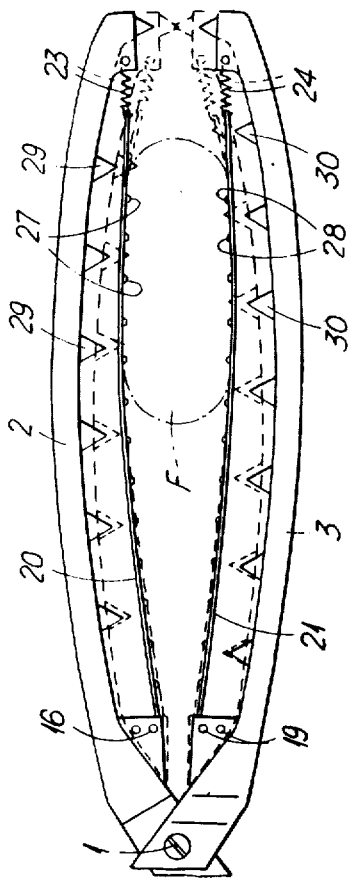

3,664,703
FISH-HANDLING DEVICE
Billy D. Talley, 1A Victoria Circus, Glasgow, Scotland
Filed Nov. 20, 1970, Ser. No. 91,243
Claims priority, application Great Britain, Sept. 26, 1970,
45,974/70; Oct. 28, 1970, 51,115/70
Int. Cl. B25b 7/02
U.S. Cl. 294—118         9 Claims

ABSTRACT OF THE DISCLOSURE

Hand tongs, especially for use in manipulating caught fish, whereof the pivotal jaws take the form of a pair of elongated legs together forming an elongated opening to receive the fish's body, gripping means being provided on the legs at the opposed longitudinal sides thereof to pierce the fish's body on closure of the legs so that slippage of the fish from between the legs is resisted, said gripping means consisting of elongated plates disposed in the opening side-by-side with the legs and lateral projections on the opposed faces of the plates, and said gripping means being spaced laterally from and resiliently yieldable towards the legs so as to engage the body yieldingly.

---

This invention relates to hand tongs especially for use by an angler for easy, safe and quick handling of the fish following their hooking and reeling-in by the angler.

One object of the invention is to provide hand tongs which will firmly grip a body without unduly damaging the body.

Another object of the invention is to provide for a two-stage gripping action whereby if the first stage proves insufficient, the second stage can quickly and smoothly be brought into effect.

An embodiment of the invention will now be described by way of example with reference to the accompanying drawings in which FIG. 1 is a side elevation of a pair of fish-handling tongs; FIG. 2 is a fragmentary end view in the direction of the arrow II in FIG. 1; FIG. 3 is a top plan view of the tongs, partly broken away to show detail; and FIG. 4 is a fragmentary side elevation showing the tongs in operation.

Referring to the drawings:

Hand tongs for use by a fisher, say following the hooking and reeling-in of a fish, are generally scissorslike with a common pivot 1 except that the elongated pivotal cutting blades are replaced by a pair of oppositely bowed elongated pivotal legs which form opposed arcuate recesses 4 and 5 together defining an elongated opening to receive the fish's body. Actuating handles consist of a pair of side-by-side finger rings 6 and 7 which form extensions of the legs beyond the common pivot 1 to enable scissor-like actuation of the legs. The oppositely bowed legs are of deep, generally rectangular-section bar whereof the outer ends form a nose portion 8 presenting a pair of opposed end faces 9 and 10 together defining a through-slot 11. Pairs of laterally spaced integral flanges 12, 13, 14 and 15 at the ends of the legs are apertured to receive transverse pins 16, 17, 18 and 19 which serve as anchorages for the ends of a pair of elongated opposed resiliently bendable plates 20 and 21 bridging the bows of the legs. The inner ends of the plates, that is the ends adjacent to the common pivot 1, are hingedly mounted on the pins 16 and 19 so that the plates are pivotal towards and from the opposed longitudinal faces 2A and 3A of the legs, there being inner and outer sets of holes 16A and 19A in the flanges 12 and 14 to enable vertical positional adjustment of the hinge pins. The outer ends of the plates, that is the ends remote from the common pivot 1, are apertured as at 22 (FIG. 3) and receive in the apertures the hooked ends of coiled tension springs 23 and 24 whereof the other ends engage around the adjacent anchorage pins 17 and 18, and the springs are maintained apart by tubular spacers 25 and 26 on said pins.

Series of circular through-holes are punched in the plates 20 and 21 so that the displaced material of the plates forms integral annular rim projections 27 and 28 which give the opposed faces of the plates a roughened or rasp-like form suitable for shallow penetration of the fish body without seriously damaging the flesh. On the outwardly arcuate inner faces 2A and 3A of the legs opposed longitudinal rows of teeth 29 and 30 formed of thin V-shaped platelets are disposed in a vertical plane and point inwards from said faces of the legs, said teeth being aligned with longitudinal slots 31 and 32 in the plates and the teeth on one leg being staggered in relation to the teeth on the other leg. Similar teeth 33 and 34 project from the opposed end faces 9 and 10 of the nose portion 8 and mesh in the through slot 11.

In use of the tongs, with the fish caught by hook and line the fisherman suspends the fish on the line at arm's length and then grips the tong handles 6, 7 with the fingers and operates the tongs scissorwise to cause the legs 2 and 3 thereof to embrace and the projections 27 and 28 on the plates 20 and 21 to pierce the suspended body. The plates and projections (rasp plates) thus form gripping means for the fish. The fish thus gripped between the rasp plates 20, 21 is manually supported by means of the tongs while the hook is removed from its mouth, and it is then deposited and the tongs are removed therefrom following manual opening of the legs.

As indicated in full lines in FIG. 4, in moving the legs of the tongs to gripping position, the springs 23, 24 and the hinges 16, 19 co-operate to permit resilient outward yielding of the rasp plates 20, 21 which tend to accommodate themselves to the cross-sectional contour of the fish F, while the projections 27 and 28 on the plates pierce the flesh to maintain a firm grip on the body without appreciably damaging the flesh. If the grip is not sufficiently firm to avoid risk of slippage of say a struggling fish from between the rasp plates, then further closing movement of the legs is effected by finger action on the handles to cause the points of teeth 29 and 30 to pass through the slots 31 and 32 in the rasp plates and pierce the flesh, as indicated by broken lines, and so increase the grip to the extent required. The toothed nose portion 8 at the outer ends of the legs is most useful in that either jaw of the nose portion readily penetrates the mouth of the fish to enable gripping of the jaw of the fish between the teeth 33, 34 and subsequent conveyance of the fish by means of the tongs.

By virtue of the invention heavily scaled, spiky and slimy coarse fish can be handled with ease without risk of wounding the hands and without risk of acquiring skin conditions due to the constant direct handling of fish.

It will be apparent that the hand tongs of the present invention can be made in different sizes to suit requirements for handling different species of fish. Also, the hand tongs may be made of any suitable material having in mind the economics of manufacture and the intended use of the tongs.

Also, modifications may be made without departing from the scope of the invention.

In one modification the teeth 29, 30 are dispensed with so that the only gripping means provided are the rasp plates 20, 21.

I claim:

1. Hand tongs especially for use in manipulating caught fish, comprising a jaw structure having a pair of opposed elongated legs pivotal towards and from each other and in closed position defining between them an elongated opening, and gripping means on the jaw structure consisting of elongated plating disposed in the opening side-by-side with the jaw structure and lateral projections on the plating for engaging a body enclosed by the jaw structure, said gripping means being spaced laterally from and resiliently yieldable towards the jaw structure so that on closure of the jaw structure over a body the gripping means yieldingly engage the body to tend to prevent slippage thereof from the jaw structure.

2. Hand tongs especially for use in manipulating caught fish, comprising a jaw structure having a pair of opposed elongated legs pivotal towards and from each other and in closed position defining between them an elongated opening, projections on the jaw structure extending laterally into the opening, and gripping means on the jaw structure consisting of elongated plating disposed in the opening side-by-side with the jaw structure and lateral projections on the plating for engaging a body enclosed by the jaw structure, said gripping means being spaced laterally from and resiliently yieldable towards the jaw structure so that on closure of the jaw structure over a body to an initial extent the gripping means yieldingly engage the body and on further closure of the jaw structure the gripping means yield to permit engagement of the body by the projections on the jaw structure.

3. Hand tongs according to claim 2, wherein the plating is laterally opposite the projections on the jaw structure and is apertured to permit passage of said projections through same into engagement with the body.

4. Hand tongs according to claim 3, wherein the plating is resiliently bendable laterally outwards so as to tend to conform to the contour of the body being engaged.

5. Hand tongs especially for use in manipulating caught fish, comprising a pair of opposed elongated legs pivotal from and towards each other and in closed position defining between them an elongated opening, teeth on opposed sides of the legs, a pair of opposed elongated plates in the opening and side-by-side with the legs and mounted at their ends on the adjacent ends of the respective legs, said plates being spaced laterally from the legs and being resiliently yieldable laterally outwards towards the legs, and teeth on opposed faces of the plates whereby on closure of the legs to an initial extent over a body the teeth on the plates yieldingly engage the body and on further closure of the legs the plates yield laterally to permit engagement of the body by the teeth on the legs.

6. Hand tongs according to claim 5, wherein the plates are laterally opposite the teeth on the legs and are apertured to permit passage of the teeth through same to engage the body.

7. Hand tongs according to claim 6, wherein the plates are apertured by forming openings therethrough with annular inwardly projecting rims which serve as the teeth on the opposed faces of the plates.

8. Hand tongs according to claim 6, wherein the plates are resiliently bendable laterally outwards so as to tend to conform to the shape of the body being gripped.

9. Hand tongs according to claim 8, wherein the plates have one pair of adjacent ends mounted on the respective legs for lateral pivoting movement and have the other pair of adjacent ends connected to the respective legs by tension springs whereby the plates are resiliently yieldable laterally outwards towards the legs.

References Cited
UNITED STATES PATENTS

| | | | |
|---|---|---|---|
| 3,367,703 | 2/1968 | Pittis | 294—16 |
| 2,578,344 | 12/1951 | Everett | 294—118 |
| 3,169,034 | 2/1965 | Epstein | 294—16 |
| 2,961,683 | 11/1960 | Meyer | 15—236 |

EVON C. BLUNK, Primary Examiner

J. D. CHERRY, Assistant Examiner

U.S. Cl. X.R.

294—16; 43—5